US008086831B2

(12) United States Patent
Chen et al.

(10) Patent No.: US 8,086,831 B2
(45) Date of Patent: Dec. 27, 2011

(54) INDEXED TABLE CIRCUIT HAVING REDUCED ALIASING

(75) Inventors: Lei Chen, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 12/024,241

(22) Filed: Feb. 1, 2008

(65) Prior Publication Data
US 2009/0198921 A1 Aug. 6, 2009

(51) Int. Cl.
G06F 9/35 (2006.01)
G06F 9/355 (2006.01)

(52) U.S. Cl. .................................... 712/240; 712/239
(58) Field of Classification Search .................. 712/239, 712/240
See application file for complete search history.

(56) References Cited

U.S. PATENT DOCUMENTS

| 5,623,627 | A   | * | 4/1997  | Witt ............................... 711/122 |
|-----------|-----|---|---------|----------------------------------------------|
| 6,279,105 | B1  |   | 8/2001  | Konigsburg et al.                            |
| 6,353,882 | B1  |   | 3/2002  | Hunt                                         |
| 6,446,171 | B1  | * | 9/2002  | Henriksen ..................... 711/136      |
| 6,484,256 | B1  |   | 11/2002 | Levitan et al.                               |
| 6,516,409 | B1  |   | 2/2003  | Sato                                         |
| 6,611,910 | B2  |   | 8/2003  | Sharangpani et al.                           |
| 6,823,447 | B2  |   | 11/2004 | Hay et al.                                   |
| 2002/0178349 | A1 |   | 11/2002 | Shibayama et al.                            |
| 2002/0199092 | A1 |   | 12/2002 | Henry et al.                                |
| 2004/0210749 | A1 | * | 10/2004 | Biles ............................. 712/240  |
| 2005/0027967 | A1 |   | 2/2005  | Sperber et al.                              |

(Continued)

FOREIGN PATENT DOCUMENTS

EP 0462587 12/1991

OTHER PUBLICATIONS

Levitan et al.; "Data Processing System, Processor and Method of Data Processing Having Improved Branch Target Address Cnche"; U.S. Appl. No. 11/837,893, filed Aug. 13, 7007.

(Continued)

*Primary Examiner* — Daniel Pan
(74) *Attorney, Agent, or Firm* — Yudell Isidore Ng Russell PLLC

(57) ABSTRACT

In at least one embodiment, an indexed table circuit includes a plurality of banks for storing data to be accessed and a split index array. The indexed table circuit is organized in a plurality of entries each corresponding to a respective one of a plurality of different entry indices, where each entry includes a storage location in the plurality of banks and the split index array. The indexed table circuit further includes selection logic that, responsive to read access of an entry among the plurality of entries utilizing an entry index of a bit string, utilizes a split index read from the split index array to select a set of one or more bits of a tag of the bit string, utilizes the selected set of one or more bits to select data read from one of the plurality of banks, and outputs the selected data.

23 Claims, 5 Drawing Sheets

U.S. PATENT DOCUMENTS

| | | |
|---|---|---|
| 2005/0091475 A1 | 4/2005 | Sodami |
| 2005/0262332 A1 | 11/2005 | Rappoport et al. |
| 2005/0268076 A1* | 12/2005 | Henry et al. .................. 712/239 |
| 2006/0174096 A1 | 8/2006 | Konigsburg et al. |
| 2006/0221960 A1 | 10/2006 | Borgione |
| 2006/0236036 A1* | 10/2006 | Gschwind et al. ............ 711/137 |
| 2006/0236074 A1* | 10/2006 | Williamson et al. .......... 711/216 |
| 2006/0236080 A1 | 10/2006 | Doing et al. |
| 2007/0033318 A1 | 2/2007 | Gilday et al. |

OTHER PUBLICATIONS

Bradford et al.; "Data Processing System, Processor and Method of Data Processing Having Improved Branch Target Address Cache"; U.S. Appl. No. 11/561,002, filed Nov. 17, 2006.

Eberly Jr. et al.; "The Correlation Branch Target Address Cache"; IBM TDB, vol. 36, No. 5, pp. 83-86, May 1996.

Eickenmeyer; "Improving Instruction Cache Branch Prediction with Target Addresses"; IBM TDB, vol. 36, No. 7, pp. 497-498, Jul. 1993.

* cited by examiner

INDEXED TABLE CIRCUIT HAVING REDUCED ALIASING

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, to an improved indexed table for a data processing system. In some embodiments, the indexed table can be implemented in a branch prediction table.

2. Description of the Related Art

A state-of-the-art microprocessor can comprise, for example, a cache for storing instructions and data, an instruction sequencing unit for fetching instructions from the cache, ordering the fetched instructions, and dispatching the fetched instructions for execution, one or more sequential instruction execution units for processing sequential instructions, and a branch processing unit (BPU) for processing branch instructions.

Branch instructions processed by the BPU can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bit(s) or the value of a counter.

Conditional branch instructions can be further classified as either resolved or unresolved based upon whether or not the condition upon which the branch depends is available when the conditional branch instruction is evaluated by the BPU. Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively predict the outcomes of unresolved branch instructions as taken or not taken. Utilizing the result of the prediction, the instruction sequencing unit is then able to fetch instructions within the speculative execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined prior to program execution, or utilizing dynamic branch prediction, which predicts resolutions of branch instructions by reference to branch history accumulated on a per-address basis within a branch history table (BHT) and/or branch target address cache (BTAC).

One problem to which indexed tables such as BHTs are susceptible is aliasing. Aliasing occurs when different elements having differing associated resources map to the same table entry. For example, in the case of a BHT, aliasing occurs when two different branch instruction addresses (BIAs) having different branch outcomes share a common index portion. Based upon the common index portion of the BIAs, the two BIAs will both map to a same BHT entry, which can lead to an incorrect prediction for one or both BIAs.

In many cases, decreasing aliasing in an indexed table by increasing the number of bits utilized to index into the table is not practical in that the addition of one additional index bit doubles the size of the indexed table. Even so, increasing the number of indexed bits does not guarantee elimination of aliasing because in some cases addresses (or other bit strings utilized as resource identifiers) only differ in their higher-order bits. In such cases, increasing the number of index bits, which are typically drawn from the more variable lower-order bits of an address, may not eliminate aliasing.

SUMMARY OF THE INVENTION

In at least one embodiment, an indexed table circuit includes a plurality of banks for storing data to be accessed and a split index array. The indexed table circuit is organized in a plurality of entries each corresponding to a respective one of a plurality of different entry indices, where each entry includes a storage location in the plurality of banks and the split index array. The indexed table circuit further includes selection logic that, responsive to read access of an entry among the plurality of entries utilizing an entry index of a bit string, utilizes a split index read from the split index array to select a set of one or more bits of a tag of the bit string, utilizes the selected set of one or more bits to select data read from one of the plurality of banks, and outputs the selected data.

DETAILED DESCRIPTION OF ILLUSTRATIVE EMBODIMENT

Figure 1:
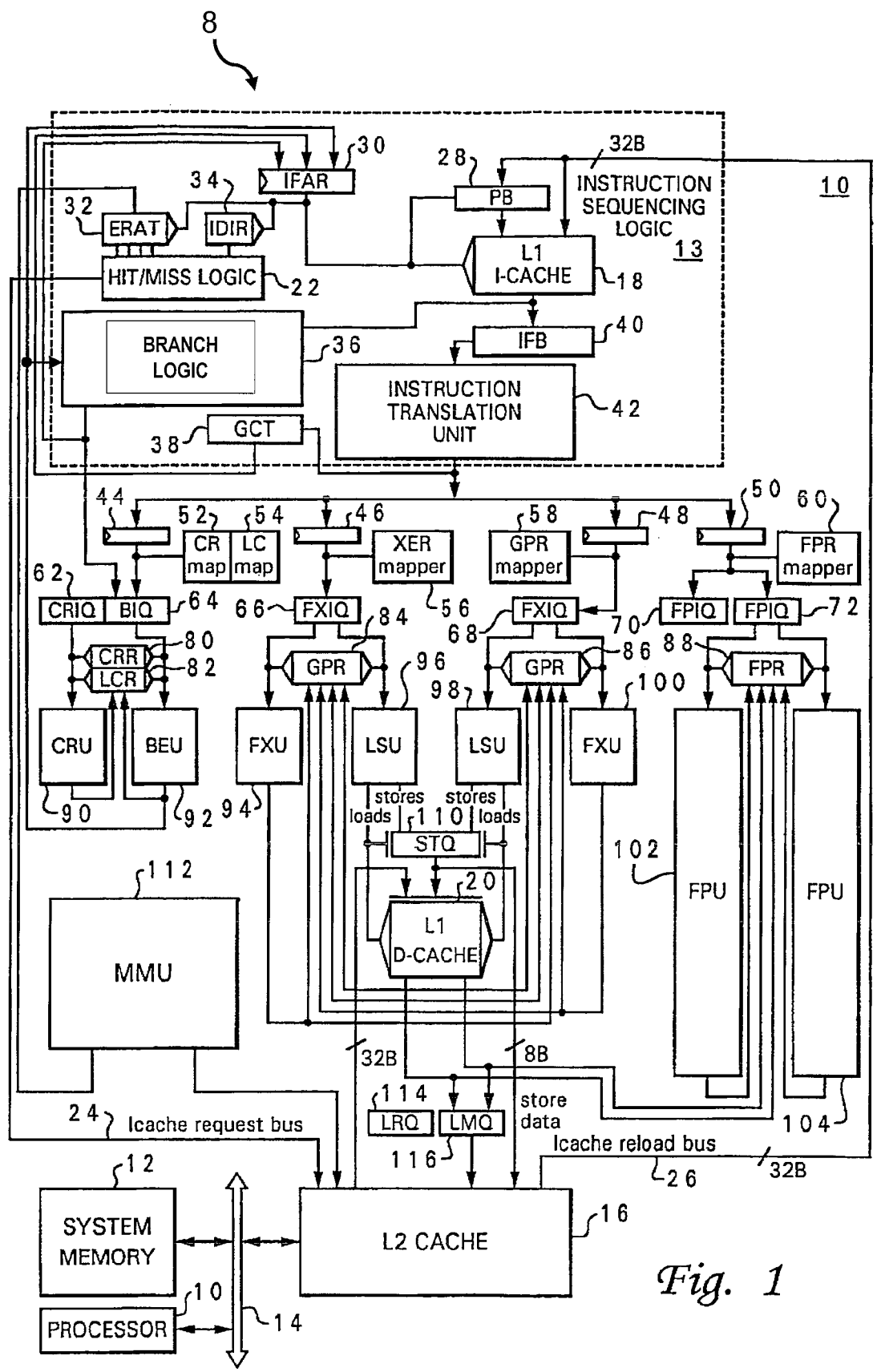
FIG. 1 is an exemplary embodiment of a data processing system in accordance with the present invention.

With reference now to FIG. 1, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a block of instructions (e.g., a 32-byte cache line) to be fetched from L1 I-cache 18 for processing. During each cycle, a new instruction fetch address (IFA) may be loaded into IFAR 30 from one of at least three sources: branch logic 36, which provides speculative branch target addresses resulting from the prediction of conditional branch instructions, global completion table (GCT) 38, which provides sequential path addresses, and branch execution unit (BEU) 92, which provides non-speculative addresses resulting from the resolution of pre-dicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the block of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the block of instructions specified by the EA in IFAR 30 resides in L1 cache 18, L1 I-cache 18 outputs the block of instructions to both branch logic 36 and to instruction fetch buffer (IFB) 40. As described further below with respect to FIG. 2A, branch logic 36 scans the block of instructions for branch instructions and predicts the outcome of conditional branch instructions in the instruction block, if any. Following a branch prediction, branch logic 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the block of instructions received from L1 I-cache 18 until the block of instructions can be translated, if necessary, by an instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. In some embodiments, the instructions are also maintained in issue queues 62-72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90-104 is preferably implemented as an execution pipeline having a number of pipeline stages.

During execution within one of execution units 90-104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by branch logic 36. If the path addresses match, branch logic 36 updates its prediction facilities, if necessary. If, however, the calculated path address does not match the predicted path address, BEU 92 supplies the correct path address to IFAR 30, and branch logic 36 updates its prediction facilities, as described further below. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Figure 2A:
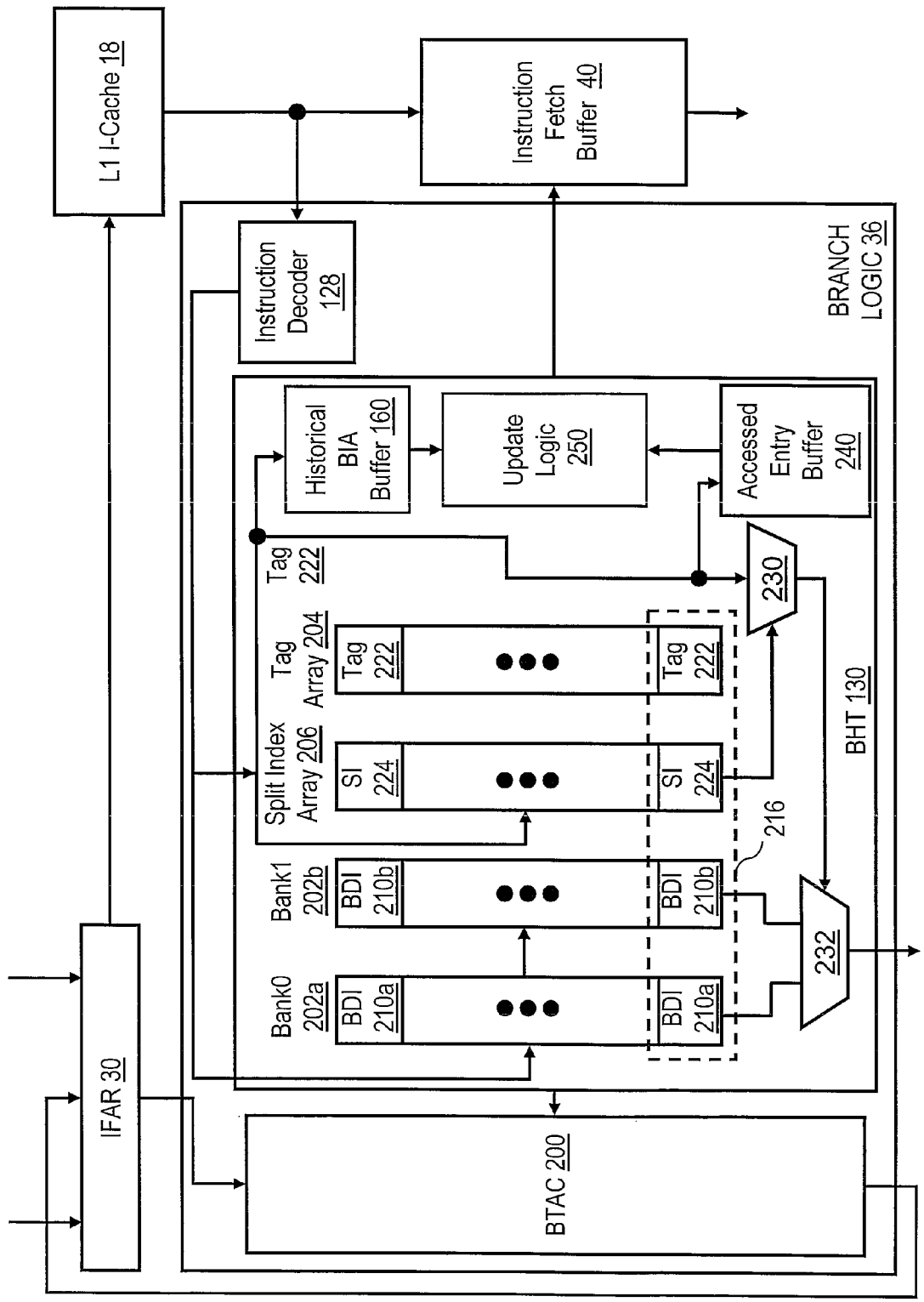
FIG. 2A is a more detailed block diagram of branch logic containing a two-bank indexed table in accordance with the present invention.

Referring now to FIG. 2A, there is depicted a more detailed block diagram of an exemplary embodiment of branch logic 36 of FIG. 1 in relation to other components of instruction sequencing logic 13. In the illustrated embodiment, branch logic 36 includes an instruction decoder 128, branch direction prediction circuitry such as branch history table (BHT) 130, and branch target address prediction circuitry such as branch target address cache (BTAC) 200. In alternative embodiments of the present invention, the branch direction prediction circuitry can be implemented utilizing any other type of branch direction prediction circuitry, including without limitation, static branch prediction circuitry or two-level dynamic branch prediction circuitry. In addition, the branch target address prediction circuitry can also be implemented utilizing other known or future developed branch target address prediction circuitry, such as a branch target buffer (BTB). Further, in some embodiments, the physical structures utilized for branch direction prediction and branch target address prediction may be merged. The present invention is equally applicable to all such embodiments.

Instruction decoder 128 is coupled to receive each instruction fetch block as it is fetched from L1 I-cache 18 and placed in instruction fetch buffer 40. Instruction decoder 128 scans each instruction block for branch instructions, and in response to detecting a branch instruction, forwards the instruction address of the branch instruction to the branch direction prediction circuitry (e.g., BHT 130) for direction prediction. Concurrently with the operation of instruction decoder 128 and BHT 130, BTAC 200 predicts branch target addresses based upon the instruction fetch addresses (IFAs) in IFAR 30.

Figure 2B:
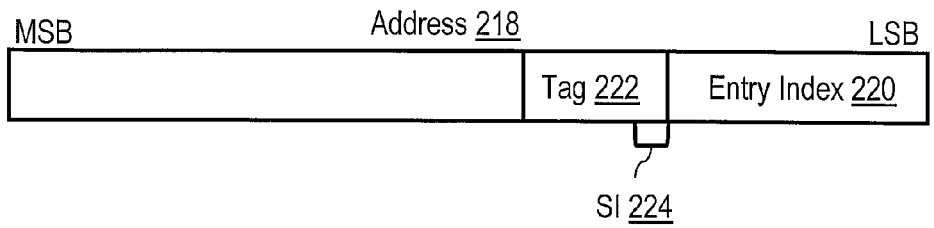
FIG. 2B is an exemplary embodiment of an instruction address utilized within the data processing system of FIG. 1.

Referring now to FIG. 2B, there is illustrated an exemplary embodiment of an instruction address, such as a branch instruction address, used within data processing system 8 of FIG. 1 to access BHT 130. As illustrated, address 218 contains a number of higher order bits including a most significant bit (MSB) and a number of lower order bits including a least significant bit (LSB). A first set of the lower order bits (which may or may not include the LSB) form an entry index 220, and a second, higher order set of bits form a tag 222. A split index 224 is formed of at least one bit and up to all bits of tag 222.

Returning to FIG. 2A, in the depicted embodiment BHT 130 includes $2^N$ banks 202 (where integer $N \geq 1$) for storing branch direction indications (BDI) 210a, 210b indicative of "taken" or "not-taken" predictions, a tag array 204 for storing tags 222 of branch instruction addresses, and a split index array 206 for storing split indices (SIs) 224 of branch instruction addresses. Storage locations in banks 202a, 202b, tag array 204 and split index array 206 are accessed by an entry index 220 of the instruction address of a branch instruction. The storage locations across banks 202a, 202b, tag array 204 and split index array 206 corresponding to each entry index 220 are logically referred to as an entry 216 of BHT 130. Thus, BHT 130 includes a plurality of entries 216 each uniquely corresponding to a particular entry index 220.

As further shown in FIG. 2A, BHT 130 includes a historical BIA buffer 160, which buffers a sequence of one or more branch instruction addresses received from instruction decoder 128, and an accessed entry buffer 240, which buffers a sequence of one or more tags 222 utilized to access entries 216 of BHT 130. In addition, BHT 130 includes update logic 250 that updates branch direction predictions within BHT 130 as necessary. Further details regarding BHT 130 and its operation are provided below with reference to FIGS. 3-4.

Figure 3:
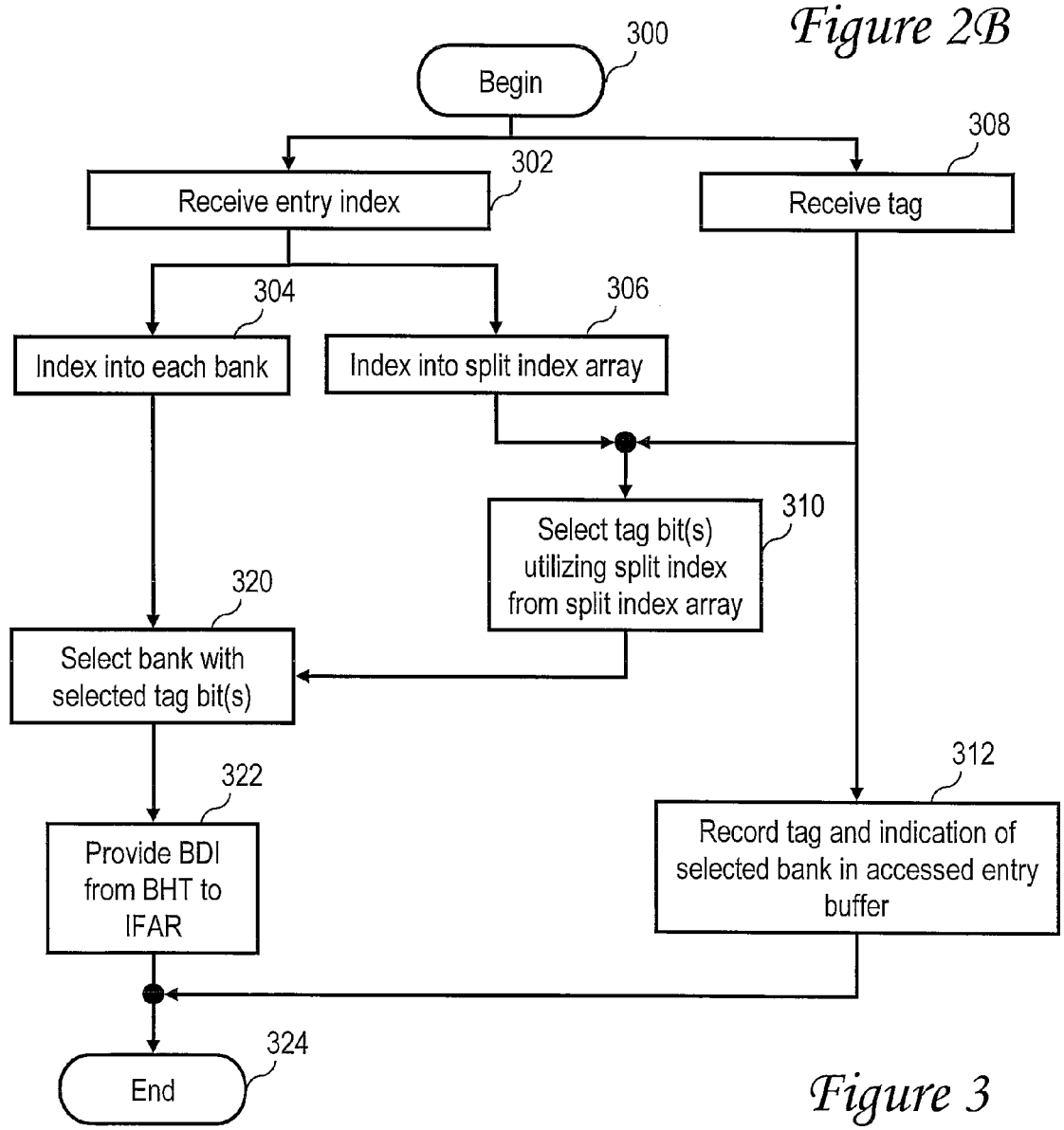
FIG. 3 is a high level logical flowchart of an exemplary method by which a Branch History Table (BHT) provides branch direction predictions in accordance with the present invention.

With reference now to FIG. 3, there is illustrated a high level logical flowchart of an exemplary method by which BHT 130 provides speculative branch direction predictions in accordance with the present invention. As a logical flowchart, it will be appreciated that in at least some embodiments of the process depicted in FIG. 3 at least some of the illustrated steps can be performed concurrently and/or in a different order than that shown.

The process of FIG. 3 begins at block 300 and then proceeds to block 302, which illustrates BHT 200 receiving at least the entry index 220 and tag 222 of a branch instruction from instruction decoder 128. In response to receipt of the entry index 200, BHT 130 reads out the contents of the storage locations corresponding to the entry index 200 within banks 202a, 202b, and split index array 206 (blocks 304 and 306). As indicated at block 310, selection logic, such as first multiplexer 230, uses the split index 214 output from split index array 206 to select a set of one or more hits within tag 222 that is to be utilized to select one of BDIs 210a, 210b as the branch direction prediction. The selected set of tag bit(s) are in turn utilized by selection logic, such as second multiplexer 232, to select either BDI 210a or BDI 210b as the predicted branch target address (block 320). BHT 130 then furnishes the selected BDI 210 to IFAR 30 to influence selection of a next instruction fetch address, as shown at block 322.

As shown at block 312, BHT 130 also stores the tag 222 and an indication of the selected bank 202 within accessed entry buffer 240 in case an update is to be made to a branch direction prediction within the entry 216 selected by the entry index 220, as discussed below with reference to FIG. 4. Following blocks 312 and 322, the process illustrated in FIG. 3 terminates at block 324 until the entry index 220 and tag 222 of a next branch instruction address is received by BHT 130.

The process depicted in FIG. 3, which can be extended to an indexed table of any number of banks, reduces aliasing in an indexed table by selecting table contents utilizing not only the lower order bits forming the entry index, but also higher order bits forming the tag. While simply including higher order bits in the selection process can reduce aliasing somewhat, aliasing is still possible if the higher order bits of multiple addresses share common bit values. Consequently, in the embodiment of FIGS. 2-3, a split index 214 is utilized to select one or more particular higher order bits from those comprising tag 222 that are known to differ for multiple addresses corresponding to a given entry 216, meaning that aliasing for the entry 216 is further reduced or eliminated.

For some applications of indexed tables, aliasing is generally viewed as a problem. However, for the application of branch prediction, aliasing is not always a problem. In the context of branch prediction, aliasing can be constructive, neutral, or destructive depending on its effect on the branch prediction result. If aliasing has no effect on the branch prediction result, then the aliasing is neutral. If aliasing improves the branch prediction by obtaining a correct branch prediction when the branch prediction otherwise would have been wrong, then the aliasing is constructive. However, if the aliasing made a branch prediction which otherwise would have been right incorrect, then the aliasing is destructive. Because only destructive aliasing negatively impacts performance, in at least one embodiment, BHT 130 is updated only if the branch direction prediction of BHT 130 was incorrect.

Figure 4:
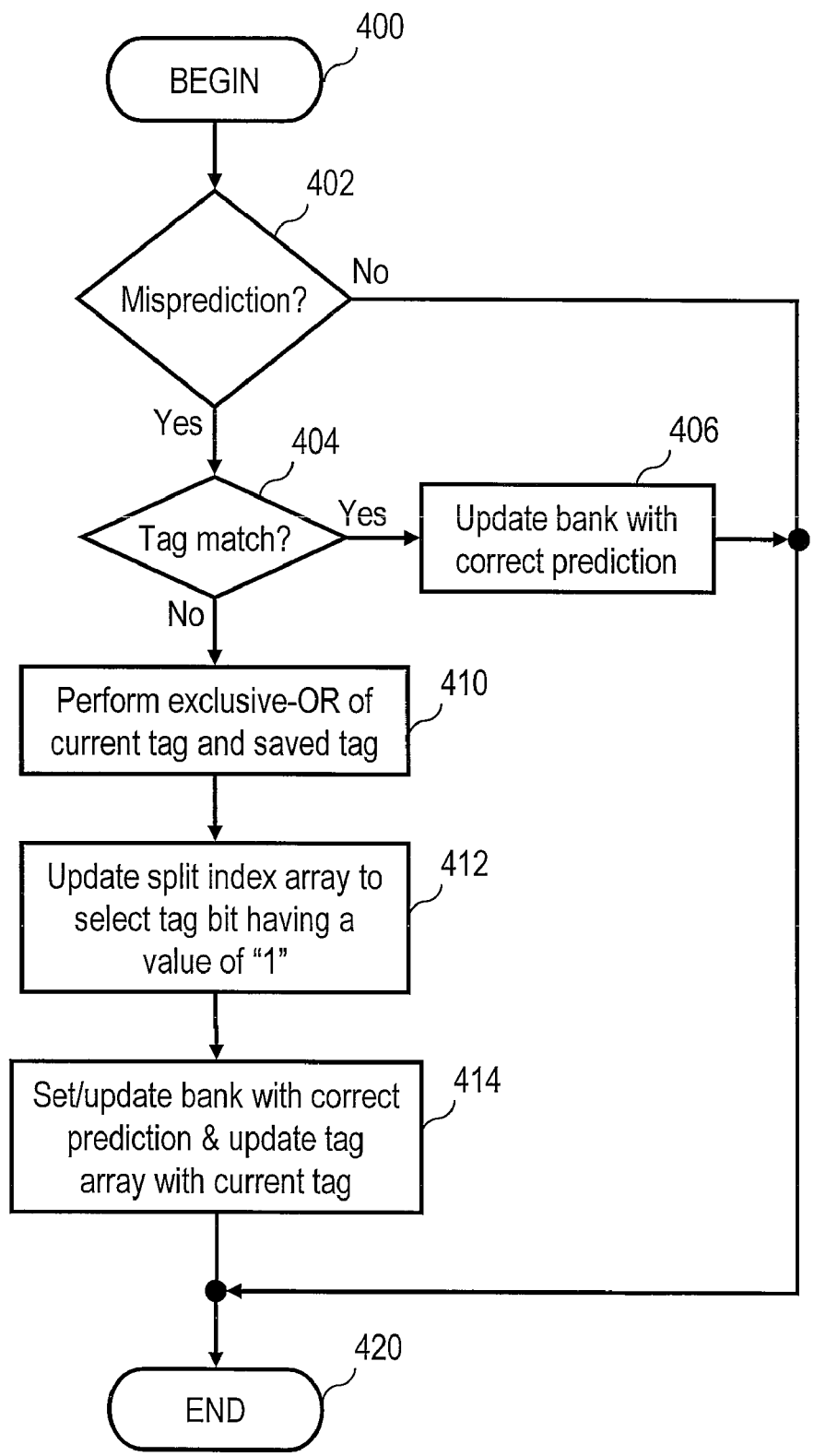
FIG. 4 is a high level logical flowchart of an exemplary method by which the branch direction predictions within the BHT are updated in accordance with the present invention.

Referring now to FIG. 4, there is illustrated a high level logical flowchart that depicts an exemplary method by which the branch direction predictions within BHT 130 are updated in response to a misprediction in accordance with the present invention. The process begins at block 400 of FIG. 4 and then passes to block 402, which depicts BHT 130 detecting whether or not a previous branch direction prediction was incorrect. For example, the determination illustrated at block 402 can be made by determining whether BHT 130 has received an indication from BEU 92 that BHT 130 mispredicted a branch instruction that has been executed by BEU 92. If BHT 130 does not detect a misprediction, no update to the branch direction predictions recorded within BHT 130 is made, and the process terminates at block 420. If, however, BHT 130 detects at block 402 that it made a misprediction, the process passes to block 404.

Block 404 illustrates update logic 250 determining whether or not the buffered tag 222 corresponding to the misprediction, which is retrieved along with the selected bank indication from accessed entry buffer 240, matches the tag 222 in the storage location of tag array 204 corresponding to the instruction address of the misprediction, which is retrieved from historical BIA buffer 160. The determination depicted at block 404 indicates whether or not the misprediction was due to destructive aliasing. In response to a determination at block 404 that the tags 222 match, update logic 250 determines that the misprediction was not due to destructive aliasing and therefore simply updates the bank 202 that provided the incorrect BDI 210 with the correct BDI 210, as illustrated at block 406. Following block 406, the process terminates at block 420.

Returning to block 404, in response to a determination that the tag 222 retrieved from accessed entry buffer 240 and the tag 222 obtained from tag array 204 do not match, meaning that the misprediction was due to destructive aliasing, update logic 250 corrects the branch prediction and de-aliases the relevant entry 216, as depicted at blocks 410-414.

Referring first to block 410, update logic 250 performs an exclusive-OR (XOR) of the tag 222 retrieved from accessed entry buffer 240 and the tag 222 obtained from tag array 204. As will be appreciated, in at least some embodiments, the computation of the XOR of tags 222 at block 410 can be merged with the comparison of the tags 222 at block 404 in that an XOR result of 0b0 indicates that the tags 222 match, while a non-zero result indicates one or more bit positions at which tags 222 differ. Any of the bit position(s) at which tags 222 differ can therefore be utilized to de-alias the relevant entry 216. Accordingly, at block 412, update logic 250 updates split index array 206 to select a bit of tag 222 at which the XOR result has a value of 0b1. For example, in at least some embodiments, the least significant bit position at which the XOR result is 0b1 is selected for simplicity.

As illustrated at block 414 update logic 250 also set or updates the bank 202 containing the misprediction and updates tag array 204 with the current tag 222. Following block 414, the process depicted in FIG. 4 terminates at block 420.

While the present invention has been described with reference to BHT that predicts branch direction based upon instruction address tags, it should be understood that the present invention is applicable to other types of BHTs. As a specific example, the present invention may be applied to pattern-based branch history tables. In pattern-based branch history tables, a first table holds the outcomes or predictions of recent branches, on a per-branch or global basis, and a second table is indexed by the branch history retrieved from the first table. The anti-aliasing methodology described herein is applicable to either or both such tables.

Figure 5:
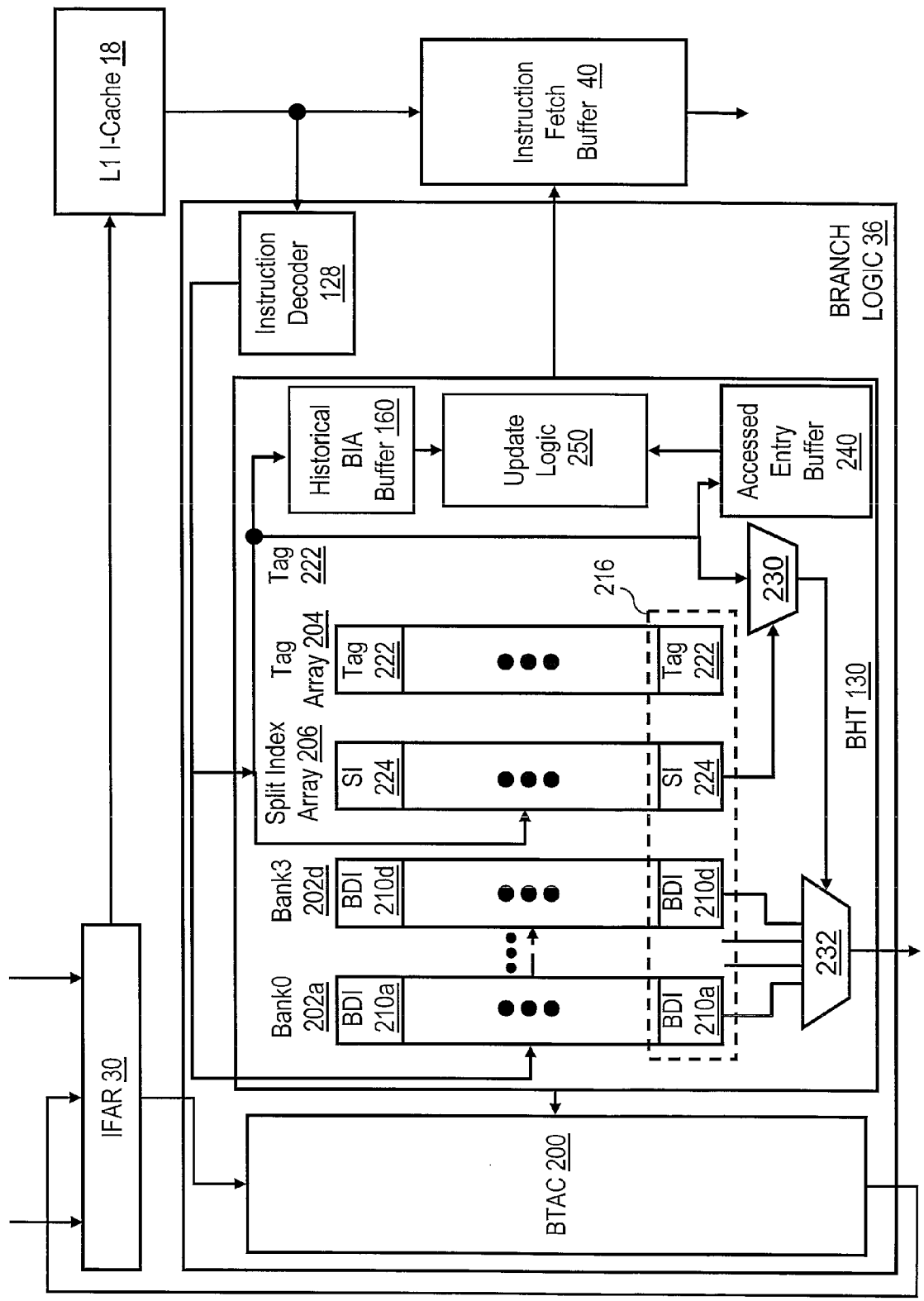
FIG. 5 is a detailed block diagram of a four-bank indexed table in accordance with the present invention.

Further, the present invention is applicable to indexed tables having any number of banks. For example, FIG. 5 depicts an embodiment of BHT 130 including four banks 202a-202d. Similar to the embodiment with two banks depicted in FIG. 2, banks 202a-202d and split index array 206 are indexed by the entry index 220. The split index 224 read from split index array 206 selects one of the four banks.

In this embodiment, tag array 204 is shared among four prediction resources, instead of two for the previous described embodiment of FIG. 2. Accordingly, the overhead of tag array 204 per prediction resource is reduced. To further reduce the overhead, further constraint can be placed upon split indices 224 to reduce the overall storage required for split index array 206. For example, if split index array 206 holds split indices 224 that are 4 bits in length, six different bit combinations to select two bits out of the 4-bit tags 222 to select one of the four banks 202 are possible. To express any of 6 different bit combinations at least 3 bits are required. However, if the 4 tag bits are divided into two groups and one and only one bit is selected for each group, then each group can be specified by one bit, and only two bits are needed. Accordingly, update logic 250 and the bank selection logic may also be simplified.

Depending on the relative sizes of the tags 222 and split indices 224, it may take fewer bits to record the not-selected tag bits instead of the selected tag bits. For example, if eight banks 202 and 4-bit tags 222 are implemented, it takes fewer bits to record which one of the four tag bits is not selected than to record which three tag bits are selected. Consequently, in such embodiments, it is efficient to implement split indices 224 with inverted logic.

It should further be appreciated that the present invention is not restricted in application to indexed tables utilized for branch prediction, but is instead broadly applicable to any indexed table within a data processing system. In these other applications, the bit string utilized to access the indexed table may not represent an address, but can instead represent a data value, or alternatively, may have no predetermined significance.

As has been described, the present invention provides a data processing system, processor and method of data processing in which aliasing in an indexed table is reduced by dynamically selecting one or more tag bits known to differentiate values mapping to a given entry and then utilizing the selected tag bit(s) to select an output from among multiple banks within the given entry. In this manner, the mapping function is dynamically tuned to reduce destructive aliasing.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a hardware circuit that performs the functions of the present invention, it should be understood that present invention may alternatively be implemented as a program product for use with a data processing system. Without limitation, the program product may represent a simulated hardware circuit or system. As utilized herein, program product means a computer-readable media carrying, storing or encoding program code comprising statements or instructions and/or program data. Program code defining the functions of the present invention can be delivered to a data processing system via a variety of media, which include, without limitation, storage media (e.g., memory, CD-ROM, floppy diskette or hard disk drive) and communication media, such as digital and analog networks. It should be understood, therefore, that such media, when carrying or encoding computer readable instructions that direct the functions of the present invention, represent alternative embodiments of the present invention.

What is claimed is:

1. An indexed table circuit, comprising:
a plurality of banks for storing data to be accessed;
a split index array for storing split indices;
wherein:
    each of the plurality of banks and the split index array includes multiple storage locations;
    the indexed table circuit is organized in a plurality of entries each corresponding to a respective one of a plurality of different entry indices, each entry including a storage location in each of the plurality of banks and a storage location in the split index array; and
selection logic that, responsive to read access of an entry among the plurality of entries utilizing an entry index of a bit string, utilizes a split index read from the split index array to select a set of one or more bits of a tag of the bit string, utilizes the selected set of one or more bits to select data read from one of the plurality of banks, and outputs the selected data.

2. The indexed table circuit of claim 1, wherein:
the indexed table circuit forms a portion of branch logic within a processor; and
the data stored in the plurality of banks comprise branch predictions.

3. The indexed table circuit of claim 1, and further comprising update logic that updates a storage location in the split index array belonging to the entry in response to detection of destructive aliasing.

4. The indexed table circuit of claim 3, and further comprising:
a tag array for storing tags of bit strings; and
a historical buffer that buffers a sequence of one or more bit strings utilized to read at least one of the plurality of entries; and
wherein the update logic detects aliasing by comparing contents of the historical buffer and the tag array.

5. The indexed table circuit of claim 4, wherein:
said update logic compares contents of the historical buffer and the tag array by performing an exclusive-OR operation to obtain an exclusive-OR result.

6. The indexed table circuit of claim 5, wherein said update logic updates the storage location in the split index array with a split index indicating selection of a tag bit corresponding to a bit position within the exclusive-OR result having a value of '1'.

7. The indexed table circuit of claim 1, wherein:
the indexed table circuit further includes a tag array for storing tags of bit strings;
the entry index forms a first portion of a bit string; and
the indexed table circuit, responsive to the read access, updates a storage location within the tag array with a second portion of the bit string forming a tag.

8. A processor comprising:
a plurality of integrated circuits for processing data, said plurality of integrated circuits including an indexed table circuit, comprising:
a plurality of banks for storing data to be accessed;
a split index array for storing split indices;
wherein:
    each of the plurality of banks and the split index array includes multiple storage locations;
    the indexed table circuit is organized in a plurality of entries each corresponding to a respective one of a plurality of different entry indices, each entry including a storage location in each of the plurality of banks and a storage location in the split index array; and
selection logic that, responsive to read access of an entry among the plurality of entries utilizing an entry index of a bit string, utilizes a split index read from the split index array to select a set of one or more bits of a tag of a bit string, utilizes the selected set of one or more bits to select data read from one of the plurality of banks, and outputs the selected data.

9. The processor of claim 8, wherein:
the plurality of integrated circuits include one or more execution units that execute instructions and an instruction sequencing unit that provides instructions to the executions units for execution;
the indexed table circuit forms a portion of branch logic within the instruction sequencing unit; and
the data stored in the plurality of banks comprise branch predictions.

10. The processor of claim 8, and further comprising update logic that updates a storage location in the split index array belonging to the entry in response to detection of destructive aliasing.

11. The processor of claim 10, and further comprising:
a tag array for storing tags of bit strings; and
a historical buffer that buffers a sequence of one or more bit strings utilized to read at least one of the plurality of entries; and wherein the update logic detects aliasing by comparing contents of the historical buffer and the tag array.

12. The processor of claim 11, wherein:
said update logic compares contents of the historical buffer and the tag array by performing an exclusive-OR operation to obtain an exclusive-OR result.

13. The processor of claim 12, wherein said update logic updates the storage location in the split index array with a split index indicating selection of a tag bit corresponding to a bit position within the exclusive-OR result having a value of '1'.

14. The processor of claim 8, wherein:
the indexed table circuit further includes a tag array for storing tags of bit strings;
the entry index forms a first portion of a bit string; and
the indexed table circuit, responsive to the read access, updates a storage location within the tag array with a second portion of the bit string forming a tag.

15. A data processing system, comprising:
at least one processor in accordance with claim 8;
an interconnect coupled to the at least one processor; and
a system memory coupled to the at least one processor via the interconnect and operable to supply data to the at least one processor.

16. A program product, comprising:
a computer-readable storage medium;
program code stored within the computer-readable medium that when processed by a processor instantiates an indexed table including:
a plurality of banks for storing data to be accessed;
a split index array for storing split indices;
wherein:
each of the plurality of banks and the split index array includes multiple storage locations;
the indexed table circuit is organized in a plurality of entries each corresponding to a respective one of a plurality of different entry indices, each entry including a storage location in each of the plurality of banks and a storage location in the split index array; and
wherein the program code, responsive to read access of an entry among the plurality of entries utilizing an entry index of a bit string, utilizes a split index read from the split index array to select a set of one or more bits of a tag of the bit string, utilizes the selected set of one or more bits to select data read from one of the plurality of banks, and outputs the selected data.

17. The program product of claim 16, wherein:
the indexed table circuit forms a portion of branch logic within a simulated processor; and
the data stored in the plurality of banks comprise branch predictions.

18. The program code of claim 16, wherein the program code updates a storage location in the split index array belonging to the entry in response to detection of destructive aliasing.

19. The program code of claim 18, wherein:
the program code maintains:
a historical buffer that buffers a sequence of one or more bit strings utilized to read at least one of the plurality of entries; and
a tag array for storing tags of bit strings; and
wherein the program code detects aliasing by comparing contents of the historical buffer and the tag array.

20. The program code of claim 19, wherein:
the program code compares contents of the historical buffer and the accessed entry buffer by performing an exclusive-OR operation to obtain an exclusive-OR result.

21. The program code of claim 20, wherein said program code updates the storage location in the split index array with a split index indicating selection of a tag bit corresponding to a bit position within the exclusive-OR result having a value of '1'.

22. The program code of claim 16, wherein:
the indexed table includes a tag array for storing tags of bit strings;
the entry index forms a first portion of a bit string; and
program code, responsive to the read access, updates a storage location within the tag array with a second portion of the bit string forming a tag.

23. A method of performing a read access to an indexed table circuit, the method comprising:
receiving at an indexed table circuit a read access including a bit string, wherein the indexed table circuit is organized in a plurality of entries each corresponding to a respective one of a plurality of different entry indices, each entry including:
a storage location in each of a plurality of banks; and
a storage location in a split index array; and
in response to receiving the read access:
performing a read access to an entry among the plurality of entries identified by an entry index of the bit string;
selecting a set of one or more bits of a tag of the bit string utilizing a split index read from a storage location in the split index array belonging to the accessed entry;
selecting, from among data read from the plurality of banks, data from a particular one of the plurality of banks, wherein the data is selected utilizing the selected set of one or more bits; and
outputting the selected data.

\* \* \* \* \*